(12) United States Patent
Guarraci

(10) Patent No.: US 7,216,341 B2
(45) Date of Patent: May 8, 2007

(54) INSTRUMENTING SOFTWARE FOR ENHANCED DIAGNOSABILITY

(75) Inventor: Brian J. Guarraci, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 762 days.

(21) Appl. No.: 10/435,285

(22) Filed: May 9, 2003

(65) Prior Publication Data

US 2004/0226007 A1 Nov. 11, 2004

(51) Int. Cl.
*G06F 9/44* (2006.01)

(52) U.S. Cl. .................. 717/127; 717/128; 717/129

(58) Field of Classification Search ......... 717/127–133
See application file for complete search history.

(56) References Cited

U.S. PATENT DOCUMENTS

| | | | |
|---|---|---|---|
| 5,124,989 A | 6/1992 | Padawer et al. | 371/193 |
| 5,526,485 A | 6/1996 | Brodsky | 395/183.14 |
| 5,854,924 A * | 12/1998 | Rickel et al. | 717/132 |
| 5,892,941 A | 4/1999 | Khan et al. | 395/500 |
| 6,047,123 A * | 4/2000 | Brown et al. | 717/127 |
| 6,065,035 A | 5/2000 | Shulman et al. | 709/100 |
| 6,071,317 A * | 6/2000 | Nagel | 717/128 |
| 6,151,701 A * | 11/2000 | Humphreys et al. | 717/130 |
| 6,185,597 B1 | 2/2001 | Paterson et al. | 709/108 |
| 6,219,782 B1 | 4/2001 | Khan et al. | 712/227 |
| 6,330,670 B1 | 12/2001 | England et al. | 713/2 |
| 6,353,923 B1 | 3/2002 | Bogle et al. | 717/4 |
| 6,393,428 B1 | 5/2002 | Miller et al. | 707/102 |
| 6,795,963 B1 * | 9/2004 | Andersen et al. | 717/130 |
| 6,968,540 B2 * | 11/2005 | Beck et al. | 717/130 |
| 7,047,521 B2 * | 5/2006 | Bunnell | 717/130 |
| 7,051,322 B2 * | 5/2006 | Rioux | 717/143 |
| 2002/0138748 A1 * | 9/2002 | Hung | 713/190 |

OTHER PUBLICATIONS

Beaty, S.J.; A Technique for Tracing Memory Leaks in C++, Jul. 1994, pp. 17-26, OOPS Messenger, vol. 5, No. 3.
Boardman, D.B.; Greene, G.; Khandelwal, V.; Mathur, A.P.; LISTEN: A Tool to Investigate the Use of Sound for the Analysis of Program Behavior, 1995, pp. 184-189, Proceedings Ninteenth Annual International Computer Software and Applications Conference (COMPSAC '95).
Caerts, C.; Lauwereins, R.; Peperstraete, J.A.; PDG: A Process-Level Debugger for Concurrent Programs in the GRAPE Parallel Programming Environment; Mar. 1995; pp. 199-210, Future Generation Computer Systems, vol. 11, No. 2.
Cargill, T.A., Implentation of the Blit Debugger, Feb. 1985, pp. 153-168, Software-Practice and Experience, vol. 15, No. 2.

(Continued)

*Primary Examiner*—Meng-Al T. An
*Assistant Examiner*—Jason Mitchell
(74) *Attorney, Agent, or Firm*—Workman Nydegger

(57) ABSTRACT

Systems and methods are provided for instrumenting compiled software to include diagnostic information such that an origin of a call to one or more routines may be more easily identified. For example, a system is provided which unassembles or uncompiles software into a more readily identifiable instructional form, which is then searched to identify various calls to various routines of interest. Portions of the identified calls are then modified with diagnostic information that will identify the call. This diagnostic information and the call are then recorded so that the call may be subsequently traced back to its origin when, for example, an error occurs.

50 Claims, 4 Drawing Sheets

OTHER PUBLICATIONS

Evans, David; Static Detection of Dynamic Memory Errors, 1996, pp. 44-53, Proceedings of the ACM SIGPLAN '96 Conference on Programming Language Design and Implementation (PLDI) 1996.

Horn, Dawn; Scrip, Becky; Scrip, Bill; Debugging Software with Animated Graphics, 1997, pp. 72-79, Modeling, Simulations and Visualization of Sensory Response for Defense Applications, vol. 3085.

Johansen, D.; Using Forth to Debug Kernel-Less Embedded Systems, 1990, pp. 17-21, 1990 Rochester Forth Conference: Embedded Systems.

O'Reilly, S.; Debugging Drivers with Emulators and Logic Analyzers, Feb. 1998, pp. 84-85, 87-90, 93 and 95, Embedded Systems Programming, vol. 11, No. 2.

Reil, A.J.; The Prevention of Memory Leakage, 1994, pp. 149-163, Proceedings of Software DevCon '94.

Sujatha, P.; Vijaya Sankar, G.; Sarvottama Rao, A.; Satyanarayana, T.; The Role of Software Verification and Validation in Software Development Process, 2001, pp. 23-26, IETE Technical Review Jan./Feb. 2001.

* cited by examiner

INSTRUMENTING SOFTWARE FOR ENHANCED DIAGNOSABILITY

BACKGROUND OF THE INVENTION

1. Field of the Invention

The present invention generally relates to diagnosing software errors in a computer system. More particularly, the present invention relates to instrumenting compiled software to simplify locating the origin of software errors.

2. Background and Relevant Art

Software errors are responsible for a variety of computer problems ranging in severity from inaccurate or unexpected program behavior and possible program termination to operating system corruption that halts the operating system. From a user's perspective a software error may represent a relatively minor inconvenience that can be addressed by occasionally retrying an operation, restarting an application, or rebooting the computer, or may lead to much more serious problems such as data corruption or loss and unstable computer operation. Of course, minor inconveniences are better tolerated by users, but software developers generally devote a significant amount of time and resources to testing software so that users will have a positive experience when using the software.

Because computer programs and drivers generally contain a significant amount of computer code, locating the source of an error often is the most difficult task in correcting the error. One reason for the difficulty in locating errors is that errors generally are caused in one place, but surface in another. Depending on the nature of an error, the software that caused the error and the software that detects the error may be completely unrelated. As a result, to locate the source of the error, investigation initially focuses on where the error is detected, and then expands to other areas.

While software is in the development stage, the software often includes extensive error checking information and instructions to help in both reproducing and locating the source of software errors. However, much of this error checking information and instructions generally is removed from production versions of software because often much of the information is only useful in a development environment and because it may have a negative impact on resource consumption and software performance. Nevertheless, most production software includes some level of error checking so that information regarding the nature of an error can be reported to the user and/or otherwise recorded for future reference. Usually this information serves at least two purposes: it helps identify the conditions which lead to the problem so that a user can take some form of remedial action, such as identifying a workaround for the problem, and the information may help developers in reproducing and locating the source of the problem so that the error can be corrected.

Software error checking information and instructions typically include instructions to call error reporting and/or logging routines and information that identifies the nature of the error for use in beginning the search to locate and identify the cause of the error. Accordingly, to the extent that the error checking information and instructions are better able to narrow the area to search for an error, it becomes easier to locate and identify the cause of the error. As illustrated in FIGS. 1 and 3, however, some developers may specify ambiguous error checking information, which provides little if any guidance in locating where a software error occurs so that the cause can be identified and corrected. While source code that specifies ambiguous error checking information can be corrected relatively easily at development time, once software has been compiled and is released to end-users, the ambiguities remain unless resolved in future releases.

For example, FIG. 1 illustrates the difficulty in locating a common type of software error related to memory allocations. As an application or driver needs dynamic amounts of memory, the software makes memory allocation requests. In the case of a driver, these allocation requests may be processed by the operating system. Once allocated, the software accesses the allocated memory through a pointer of some sort. Errors often occur, however, when the software writes data beyond the boundaries of the allocated memory, neglects to deallocate the memory, attempts to access the memory through an invalid pointer, such as after the memory has been deallocated or after the memory pointer has been corrupted, and the like.

Because memory allocations frequently lead to software errors, routines for memory allocation may require a tag to be specified so that if a memory related software error occurs, the tag may be used to help locate the source of the error. For example, if memory becomes corrupted, it is likely that the memory was overwritten. The typical culprit for overwriting memory is the software that writes to the memory that immediately precedes the corrupted memory. The tag is intended to help identify that software.

However, as indicated in FIG. 1, driver or application A 100, driver or application B 105, and driver or application C 110, all use tag X 115 when allocating tagged memory locations 120, 121, 122, and 123. In fact, driver or application A 100 uses tag X 115 in tagged memory allocations 120 and 121. Accordingly, if tagged memory allocation 122 were overwritten, tag X would provide no help in locating the software that may have been responsible, since all software uses the same tag value.

FIG. 3 presents an analogous problem for stop codes that halt the operating system. To help locate and identify the cause of an operating system halt, various standard stop codes (SSCs) are defined, labeled SSC 1 320 through SSC X 340. As shown, however, driver or application A 300 uses SSC 1 320 and SSC 3 325, driver or application B 305 uses SSC 5 330, and driver or application C 310 uses SSC 7 335. As a result, when the operating system is halted with a standard stop code that has been used in multiple places, such as SSC 1 320, SSC 3 325, SSC 5 330, SSC 7 325, it may not be possible to determine whether the error was detected in the software that duplicates the use of the standard stop codes or in the operating system itself. Note that the problem illustrated in FIG. 3 is particularly onerous since the duplicate use of standard stop codes in drivers or applications undermines the efforts of the operating system developers who defined standard stop codes to help locate and identify potential errors within the operating system.

Accordingly, there exists a need for methods, systems, and computer program products that instrument compiled software to include diagnostic information so that the origin of calls to compiled routines may be more easily identified and errors within the compiled software may be more easily located.

BRIEF SUMMARY OF THE INVENTION

In accordance with exemplary embodiments of the present invention, the above-identified drawbacks and deficiencies of current software diagnostic applications are overcome. For example, exemplary embodiments provide for a method of instrumenting compiled software to include diagnostic information so that an origin of a call to the one or more routines may be more easily identified. The present system provides for a method which unassembles or uncompiles software into a more readily identifiable instructional form. The unassembled software or instructions within the code are then searched to identify one or more calls to a routine of interest, each of which contains a parameter and a routine portion. Either one or both of the parameter and routine portions within the call are then modified with diagnostic information that will uniquely identify the call. The diagnostic information and the call are then recorded so that the call may be identified from within the routine or interest.

In accordance with another example embodiment of the present invention, the unassembling, searching and modifying of the compiled software for instrumentation purposes can all be performed at runtime when the software is loaded or offline without loading the software. Another embodiment provides for any a combination of the above steps or acts with the runtime and offline implementations. For example, one embodiment provides for unassembling and searching of the compiled software offline without loading the compiled software. At runtime when the software is loaded, information relating to the unassembly and searching processes can be retrieved such that the modification of the compiled software is done at runtime. This has the added advantage of optimizing runtime performance while not invalidating the digital signature of the software.

In accordance with yet another example embodiment of the present invention, a method and computer readable media are provided for instrumenting compiled software. The system provides for producing a plurality of software instructions from the compiled software and identifying original calls to routines of interest. The original calls are then distinguished from other calls to the routine or routines of interest. A mapping of the distinguished call to the original call is performed such that the original call may be identified from within the routine of interest based on the original call having been distinguished from any other call to the routine of interest. In another embodiment, this information is then stored and subsequently used in tracing diagnosable errors or stop codes back to the original call to the routine of interest.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and or features of the present invention will become more fully apparent from the following description and appended claims, or may be learned by the practice of the invention as set forth hereinafter.

BRIEF DESCRIPTION OF THE DRAWINGS

In order to describe the manner in which the above-recited and or advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
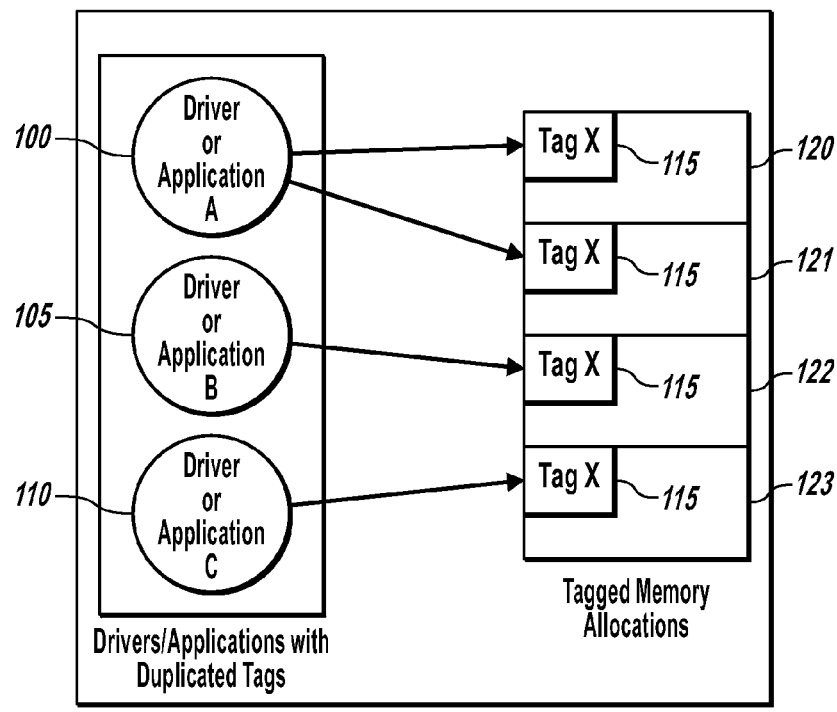
FIG. 1 illustrates prior art compiled software with ambiguous memory allocation tags.

The present invention extends to methods, systems and computer readable media for instrumenting compiled software for enhanced or simplified diagnosis of software errors. The embodiments of the present invention may comprise a special purpose or general-purpose computer including various computer hardware, as discussed in greater detail below.

Prior to discussing the present invention in more detail, it may helpful to describe three common types of software: operating systems, drivers, and applications. An operating system is the basic software that allows a user to interface with the computer. At the simplest level, an operating system provides the following two related functions. First, it manages the various hardware resources of a computer system, such as the processor, memory, video, disks, other I/O devices, etc. Second, the operating system provides a stable, consistent way for applications to interact with the hardware without having to know the implementation details of specific hardware components, which are implemented in extensions to the operating system known as device drivers or simply drivers.

For example, an operating system typically allows an application to update a display without knowing or caring about who manufactured the display adapter for controlling the display. As a result, the application can function on any computer running the operating system, independent of the particular display adapter connected to the computer. In turn, a driver, generally provided by the manufacturer of the display adapter, implements the unique features and functionality used to control a particular display. In other words, the driver takes display instructions from the operating system and converts or translates them into the commands that are needed to control the display through the display adapter. These commands may be unique to the particular display adapter or may be more generalized for a display adapter that conforms to a given standard. Other types of drivers serve analogous purposes.

Many operating systems provide at least two process modes: a relatively less trusted and therefore more restricted user mode, and a relatively more trusted and therefore less restricted kernel mode. Generally, an application runs within user mode so that applications are isolated and cannot interfere with each other's resources. A user mode process switches to kernel mode when making system calls, generating an exception or fault, when an interrupt occurs, etc. Accordingly, the operating system itself and drivers typically run in kernel mode.

Processes running in kernel mode are privileged and have access to all computer resources (such as all available memory), without the restrictions or protections that apply to user mode processes. Because the operating system kernel acts as a gatekeeper for computer resources, direct access to resources is generally limited to kernel mode processes. Distinctions between user mode processes and kernel mode processes also may be supported by computer hardware. For example, many microprocessors have processing modes to support the distinctions between user mode processes and kernel mode processes.

Due to the limitations and protections of user mode, software errors in user code tend to be less serious and limited in the scope. User mode software errors typically are the cause of inaccurate or unexpected program behavior, program termination, and potential loss or corruption of program data. As indicated above, these errors most frequently are addressed by retrying an operation or restarting an application.

In contrast, kernel mode errors generally are more serious in nature and scope because they impact the entire computer system. Kernel mode errors have the ability to corrupt and halt the operating system, and may lead to loss or corruption of data across multiple applications or even the computer system itself. As a result, kernel mode errors directly impact the stability of the operating system. Accordingly, a software error within a driver can make the operating system appear unstable, even though the operating system itself does not contain errors of that magnitude. Following a software error in kernel mode, a computer often must be rebooted.

In accordance with example embodiments of the present invention, techniques and systems are provided for instrumenting compiled software for enhanced diagnosis of computer related errors. It should be emphasized that the present invention is not necessarily limited to any of the particular types of software identified above, and is applicable to compiled software in general. Instrumenting compiled software, e.g., drivers and software applications, for enhanced diagnosability is a technology in which the compiled code of a driver is changed to affect an enhancement of some aspect of diagnosability. To achieve this instrumentation, compiled software is unassembled and appropriate areas of the code are modified. This approach is ideal for changing parameters to critical system application program interfaces (APIs) that may be misused or used in such a way that the resulting system behavior is not diagnosable due to some ambiguity.

For example, referring again to prior art FIG. 1, when compiled applications or drivers 100, 105, 110 need memory, they request blocks of memory 120, 121, 122, 123 from the operating system (not shown). The memory requests each include a tag, tag X 115, to identify the origin of the allocation request. In response to these requests, the operating system allocates the memory 120, 121, 122, 123 and stores the supplied tag for future reference. Once allocated, the compiled software 100, 105, 110 accesses the memory through some type of memory pointer or reference.

At times, a software error may lead an application or driver such as compiled software 100 to mistakenly write beyond the allocated memory block 120 and into block 121. Generally this type of software error is detected when an access to the data stored in memory block 121 reveals that the data has been corrupted. By reviewing the code that allocated and accessed memory block 120, the error that lead the software to beyond allocated memory block 120 may be identified and corrected. As indicated above, one reason for using tagged memory is the enhanced diagnostic information that the tags provide to aid in locating and identifying software errors related to memory allocation.

It is possible, however, for applications or drivers 100, 105, 110 to use a single memory pool tag 115 throughout the application or driver for all allocations or for multiple applications, or for multiple applications or drivers 100, 105, 110 to share a single tag 115. By using a single tag for multiple allocations, applications and drivers 100, 105, 110 allocate memory blocks 120, 121, 122, 123 with single tag to identify the origin of the allocation. As a result, it may not be clear which application or driver 100, made the allocation, or what call in an application or driver 100, 105, 110 requested the allocation. Accordingly, because of these tag collisions, the context of which compiled software and what area in the compiled software created and used the memory is lost. Of course, specifying unique tags at development time, before the software is compiled, represents a relatively minor task. Once the software is compiled, however, efforts to locate software errors have focused on making the best of the limited information provided by duplicate memory tags, rather than attempting to enhance or correct the information in any way.

Figure 2:
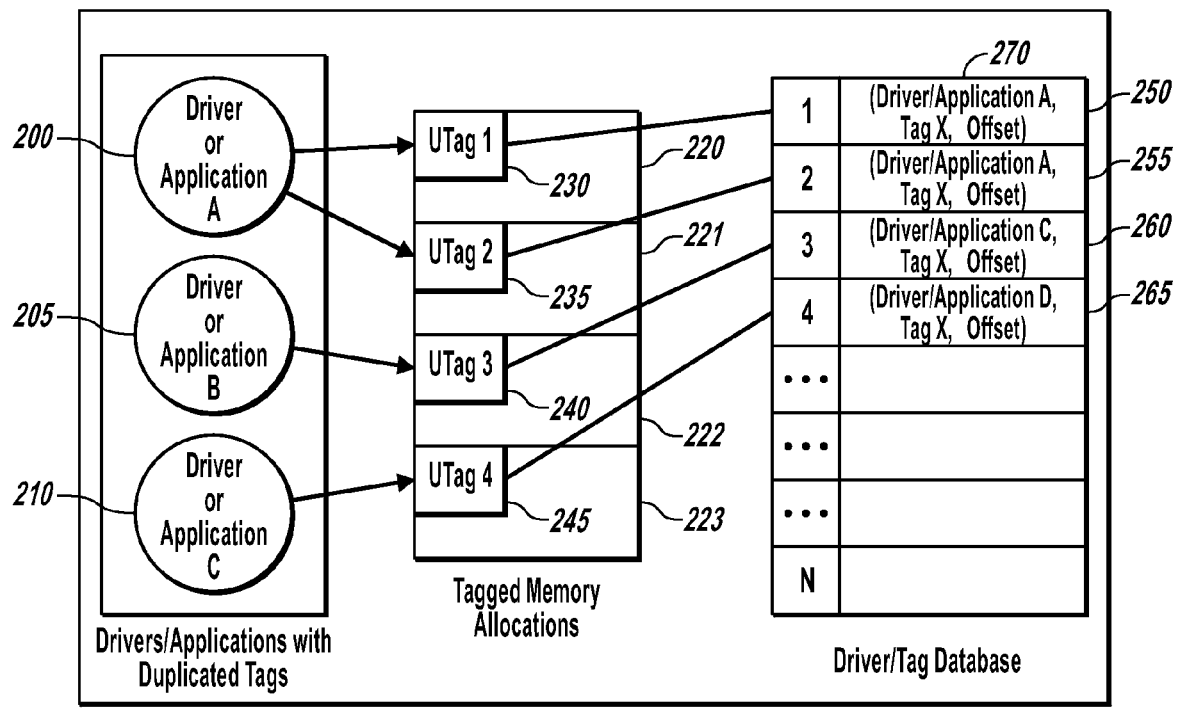
FIG. 2 illustrates compiled programs with ambiguous memory allocation tags that have been replaced unique tags in accordance with example embodiments.

In accordance with example embodiments of the present invention, a technique is provided for instrumenting compiled software by replacing the pool tags in the compiled software code with uniquely generated tags that may be traced back to the location of the original pool tags. For example, FIG. 2 shows three applications or drivers 200, 205, 210 that use duplicate tags. The compiled applications or drivers 200, 205, 210 are uncompiled or unassembled and those areas or calls in these drivers that request the allocation of memory blocks 220, 221, 222, 223 are identified. These portions of the code can then be modified or changed such that when the call or calls in the particular applications or drivers 200, 205, 210 request allocations of memory from the operating system, uniquely assigned tags 230, 235, 240, 245 are used for the corresponding memory blocks 220, 221, 222, 223. A durable storage, such as database 270, can then map the newly assigned unique pool tags 230, 235, 240, 245 to information such as the application or driver, original tag, and the offset in the code where the tag is located (see, e.g., items 250, 255, 260, and 265 in database 270)—i.e., information about the particular memory allocation call. As a result, memory corruption of a particular tagged memory region can more easily be traced back to the area in the application or driver code that allocated it.

Figure 3:
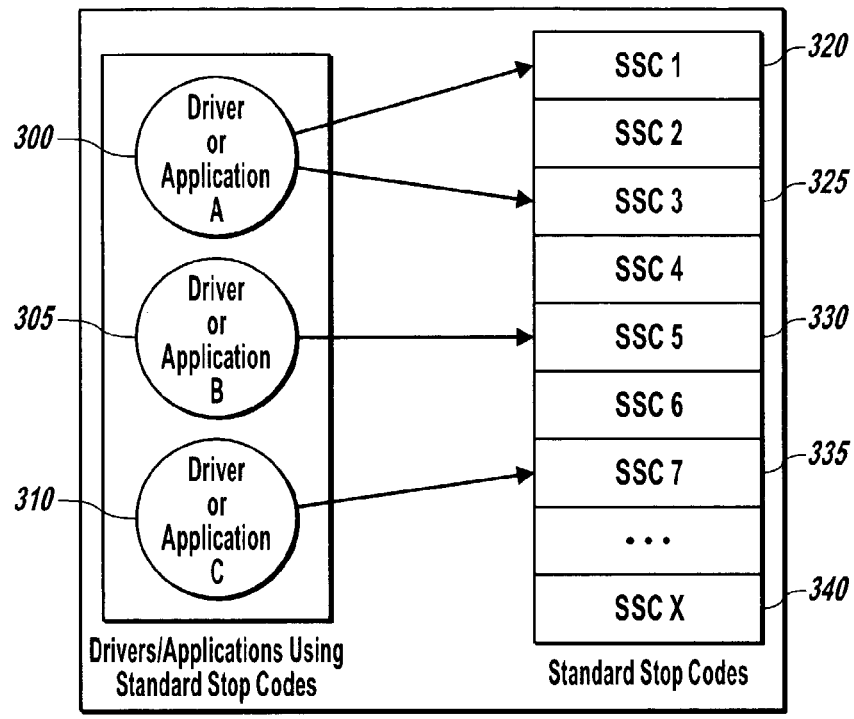
FIG. 3 illustrates prior art compiled programs using standard stop codes reserved by an operating system.

Another example use for the present invention relates to stop codes. As mentioned previously, stop codes are used to identify or diagnose an error condition prior to the operating system being halted. FIG. 3 illustrates prior art use of standard or reserved stop codes within three applications or drivers 300, 305, 310. A list of standard stop codes (SSCs) 315 ranging from SSC 1 320 to SSC X 340 is shown, with applications or drivers 300, 305, 310 making use of reserved stop codes. For example, as shown in FIG. 3, application or driver 300 assigns SSC 1 320 and SSC 3 325 for two different calls within its code, and applications or drivers 305 and 310 assign SSC 5 330 and SSC 7 335 to various calls within their respective codes.

Figure 4:
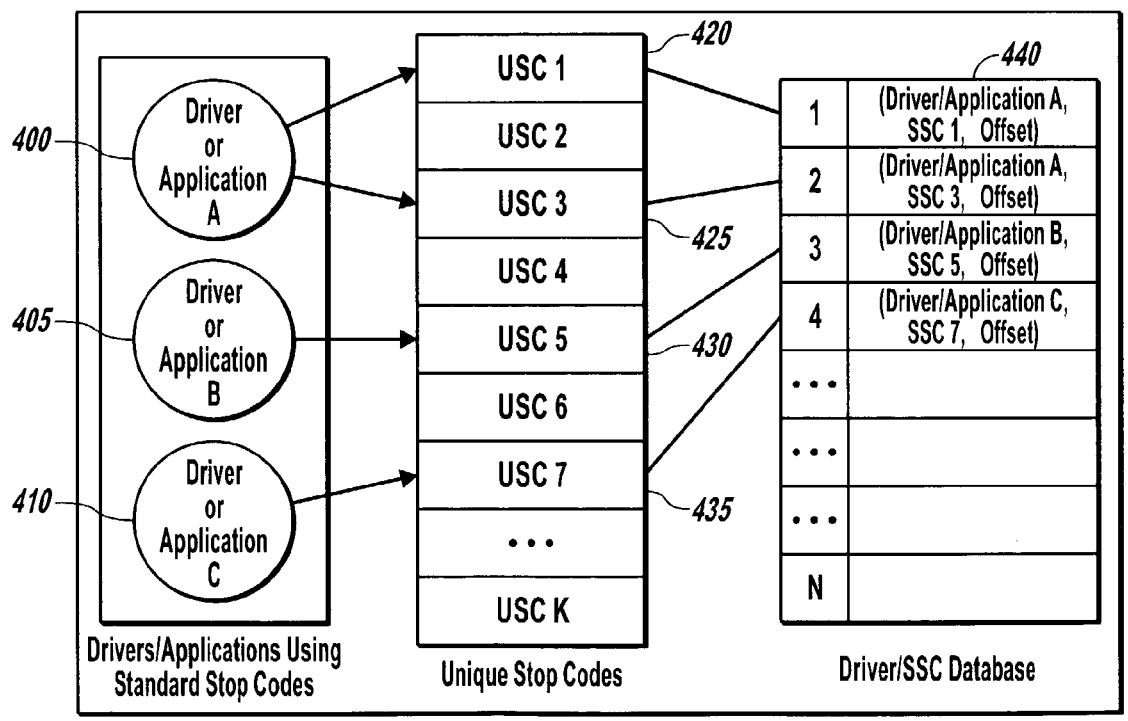
FIG. 4 illustrates compiled programs using assigned stop codes in accordance with example embodiments.

In accordance with example embodiments of the present invention, uses of reserved stop codes within applications or drivers 300, 305, 310 can be changed or modified with newly assigned codes. For example, FIG. 4 illustrates applications or drivers 400, 405, 410 that formerly used standard stop codes 320, 325, 330 and 335, described above with regard to FIG. 3. Similar to the manner described above regarding the replacement of duplicate memory tags, stop codes 320, 325, 330, 335 can be replaced with unique or alternative stop codes 420, 425, 430, 435. In particular, applications or drivers 400, 405, 410 can be unassembled and those functions calls of interest within these compiled software programs can be identified.

In one embodiment, an instrumentation engine or other system may modify and/or replaced specific portions of the code. Accordingly, when a routine to halt the system is called from these functions that have been modified, the newly assigned stop code is used in place of or substituted for the previously assigned stop code. For example, if a routine is called in application or driver 400 unique stop code USC 1 420 will be reported instead of the previously assigned stop code SSC 1 320. Depending on the circumstances, these changes to the applications or drivers 400, 405, 410 may or may not produce uniquely assigned stop codes.

A database 440 is also provided, which maps the newly assigned stop codes 420, 425, 430, 435 with information about its corresponding application or driver 400, 405, 410, original stop code 320, 325, 330, 335, and offset within the binary code. As such, the stop codes 420, 425, 430, 435 associated with the individual applications or drivers 400, 405, 410 are traceable back to the specific routine within a compiled software program 400, 405 or 410 that called the routine to halt the operating system. Accordingly, this system and technique allow for not only the reserving of certain stop codes, but also provides for a more robust system with enhanced error diagnosis capabilities.

Figure 5:
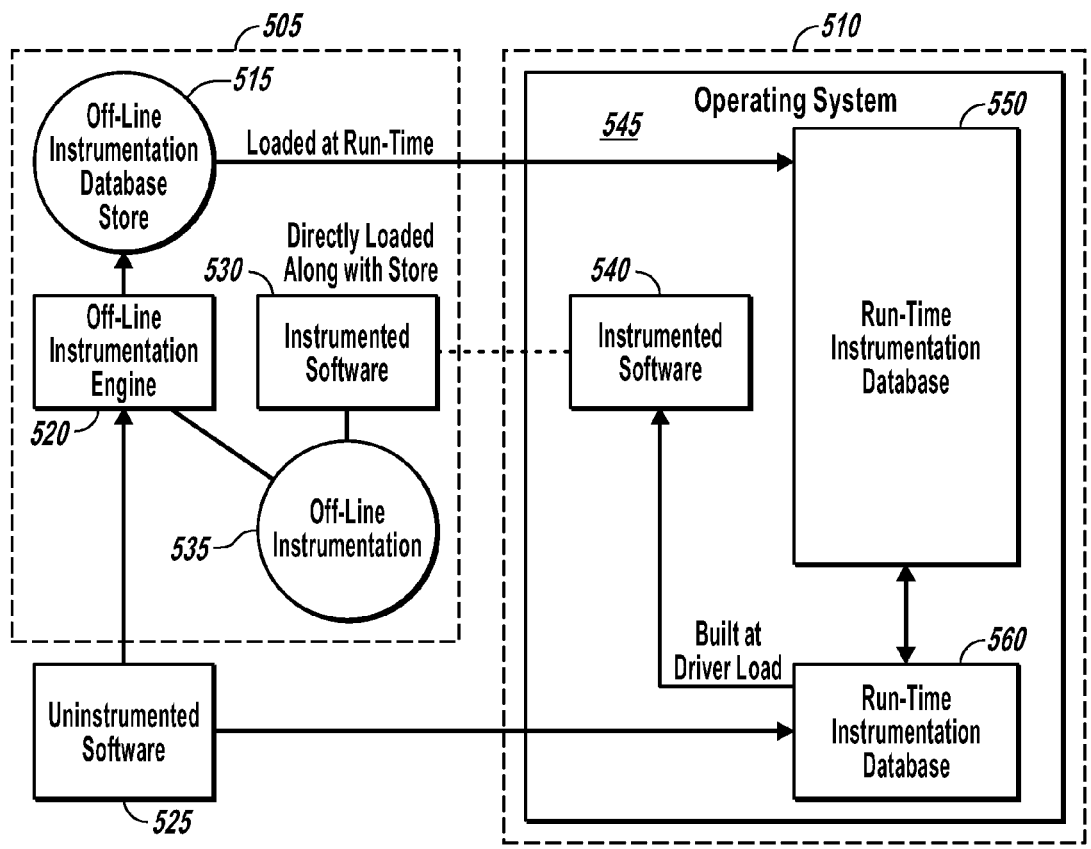
FIG. 5 illustrates example embodiments of compiled programs instrumented through either offline or runtime instrumentation engines.

FIG. 5 illustrates various ways applications and drivers are instrumented in accordance with example embodiments. One implementation is an offline 505 scenario, wherein the instrumentation of the application or driver 525 is performed before the application is loaded into the operating system 545. As shown in the pure offline process 505, application 525 is forwarded to an offline instrumentation engine 520 for processing. The uninstrumented application or driver 525, is unassembled or uncompiled and those function calls to routines of interested can be identified by the offline instrumentation engine 520. The offline instrumentation engine 520 can also modify or change the code of the uninstrumented application or driver 525 as needed for enhanced error or other diagnosis—e.g., those situations described above with regard to tag collisions and reserved stop codes.

The newly instrumented application or driver 530 is then stored in offline instrumentation store 535 with other previously instrumented applications or drivers. Further the offline instrumentation database 515 stores the information needed for tracing errors and other purposes, which as mentioned previously may include information about the corresponding application or driver 530, original stop code, and offset within the binary code. The offline engine 520 manages the offline instrumentation database store 515 so that when the offline instrumented application or driver 530 is loaded, the corresponding instrumentation information is stored in the runtime database 550. The information in offline database 515 can be merged with information in runtime database 550 to produce a collection of information about all instrumented applications or drivers currently loaded. Appropriate tools are then able to map the database entries back to the modified code in the drivers.

Instrumenting applications or drivers consumes resources and time, especially during the unassembly and call identification stages. Because offline instrumentation is a form of pre-processing of the application or driver, offline instrumenting saves system resources and time during the initial stage when the application or driver is loaded for execution.

The advantages of offline instrumentation, however, may not be ideal in all situations. For example, as a security measure it is common for drivers to be digitally signed to protect the operating system from unknown and potentially malicious extensions, and of course, applications also may be signed for similar security reasons. (Computer viruses often attach themselves to software so that when the software is executed the virus will be activated as well.)

Digitally signed software allows a computer to verify that the compiled software has not been modified, and that if the signer of the software is trusted, the software itself can be trusted. Any modification to the binary code will corrupt the signature. As such, when a compiled program is instrumented in accordance with the present offline example embodiment, and subsequently loaded, a dialog may be presented indicating that the digital signature of the compiled software is no longer valid and asking if the software should be loaded anyway. For most users, this type of warning is undesirable because it would be likely to generate support calls or undermine confidence in the software.

Other example embodiments of the present invention provide a way to instrument applications or drivers without invalidating the digital signature of the compiled software. This is done through the runtime implementation 510, i.e., at the time the application or driver 525 is loaded into the operating system. Similar to the offline instrumentation 505, the runtime instrumentation engine 560 unassembles the uninstrumented application or driver 525, identifies function calls to routines of interest, and modifies or changes the code of the uninstrumented application or driver 525 as needed for enhanced error or other diagnosis. The runtime engine 560 also manages the runtime database 550 so that when each application is loaded and instrumented, the instrumentation information is stored in the database 550. Appropriate tools can then be built to map the database entries back to the modified code in the drivers or applications. Although the applications or drivers can now be instrumented without damaging the signature, system processing is impeded during load time.

In yet another example embodiment of the present invention, a pseudo runtime implementation is provided, which maximizes processing time during instrumentation of a compiled program without corrupting its signature. In this scenario, offline instrumentation engine 520 can unassemble or decompile software 525 and identify functions calls to routines of interest. Rather than changing or modifying the code during the offline time 505, information about where these changes or modifications need to be made is recorded, e.g., in offline database 515. Subsequently, when the application or driver 525 is loaded at runtime, this stored information can be used as a tool to modify the code without having to first unassembled it. Accordingly, the changes are made without damaging the signature and with faster load time processing speed than a pure runtime implementation.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 6:
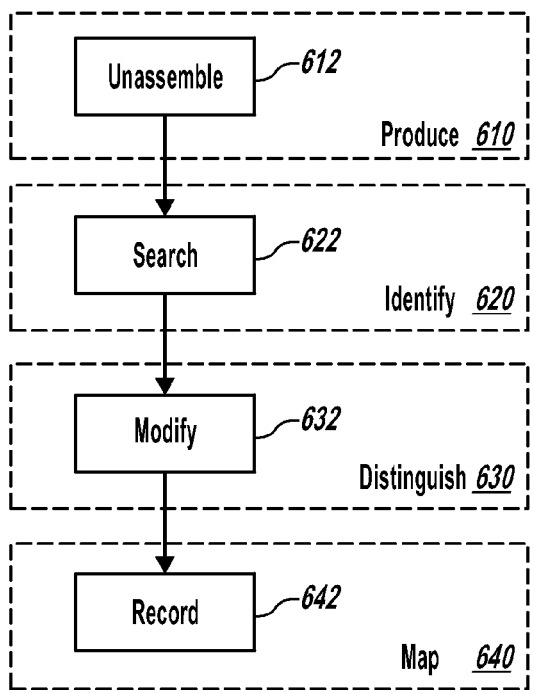
FIG. 6 illustrates example acts and steps for methods of instrumenting compiled software in accordance with example embodiments.

FIG. 6 illustrates example steps and acts used in instrumenting compiled software for enhanced diagnostic purposes, such as tracing the origin of an error. A step for producing (610) a plurality of software instructions from compiled software may include an act of unassembling (612) the compiled software. It is worth noting that compiled software is essentially a sequence of binary bytes. When executed, the binary bytes are grouped into instructions which have some type of relationship with each other. Accordingly, the plurality of software instructions that are produced, perhaps through the act of unassembling the compiled software, can be thought of as a conversion of the sequence of bytes into logical instructions suitable for execution, such as assembly code instructions. As mentioned previously with regard to FIG. 5, the unassembly can be implemented by an instrumentation engine when loading the application or driver, or sometime before load time and stored for subsequent retrieval A step for identifying (620) at least one original call to a routine of interest from the plurality of instructions may include an act of searching (622) the unassembled software for one or more instructions that identify a call to the routine of interest. The original call of interest may comprise a parameter portion and a routine portion for calling the routine of interest. The instrumentation engine may search for instructions that satisfy certain matching criteria, such as a pattern of instructions. For example, the instrumentation engine might search for function calls or routines that request memory allocation, or code that calls bug checking routines with stop codes. It should be noted, however, that the search and instrumentation of software in accordance with the present invention extends beyond the search for assigning memory pool tags or calling standard stop codes.

Because of the high risk in corrupting a compiled program or the operating system itself when modifying compiled software, there may be some level of reliability in properly identifying code patterns. Accordingly, example embodiments provide for identification of the appropriate areas to be modified or altered based on some level of security, which safely identifies predefined patterns within a binary code. For example, satisfying matching criteria may involve meeting a certain probability threshold, as opposed to an exact match. As one of ordinary skill in the art would recognize, these predefined patterns or sequences could be for example based on modeling or load table values.

A step for distinguishing (630) the original call to a routine of interest from any other call to the routine of interest may include an act of modifying (632) the parameter portion of the original call, the routine portion of the original call, or both. The modification may include such things as substituting one call for another or one parameter for another. For example, as described above, an ambiguous or reserved parameter may be replaced by a unique parameter. Accordingly, the modification also includes such things as replacing the original call to an outline of interest with a new call (i.e., thunking). For example, the original call containing an original parameter could be replaced a call to a new routine and potentially a new parameter. This new routine could report run-time diagnostics. This new routine that is now in place of the original call could not only report run-time diagnostics, but also make the original call. As described above, these modifications, as well as other processing step or acts, may be performed offline, at runtime, or may involve a combination of runtime and offline processing.

A step for mapping (640) a distinguished call to an original call so that a location of the original call may be identified from within a routine of interest may include an act of recording (642) diagnostic information and the original call. Diagnostic data associated with the change is mapped for tracing purposes. For example, information regarding the compiled code and the modifications and changes made can be stored in a durable database, memory, or some type of file. This information might include information about the application or driver such as a name and version, a hash signing key or code, etc. The information also may include data such as where in the application or driver the modification was made (e.g., offset information), the name or identity of the function call associated with the modification, the nature of the modification and how it relates to the unmodified call and/or parameters, and other such information. Accordingly, when an error in the software occurs appropriate tools are able to map the database entries back to the modified code in the applications or drivers.

Embodiments within the scope of the present invention also include computer-readable transmission or storage media for carrying or having computer-executable instructions or data structures stored thereon. Such computer-readable media can be any available media that can be accessed by a general purpose or special purpose computer. By way of example, and not limitation, such computer-readable storage media can comprise RAM, ROM, LEP-ROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable transmission medium. Thus, any such connection is properly termed a computer-readable transmission medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 7:
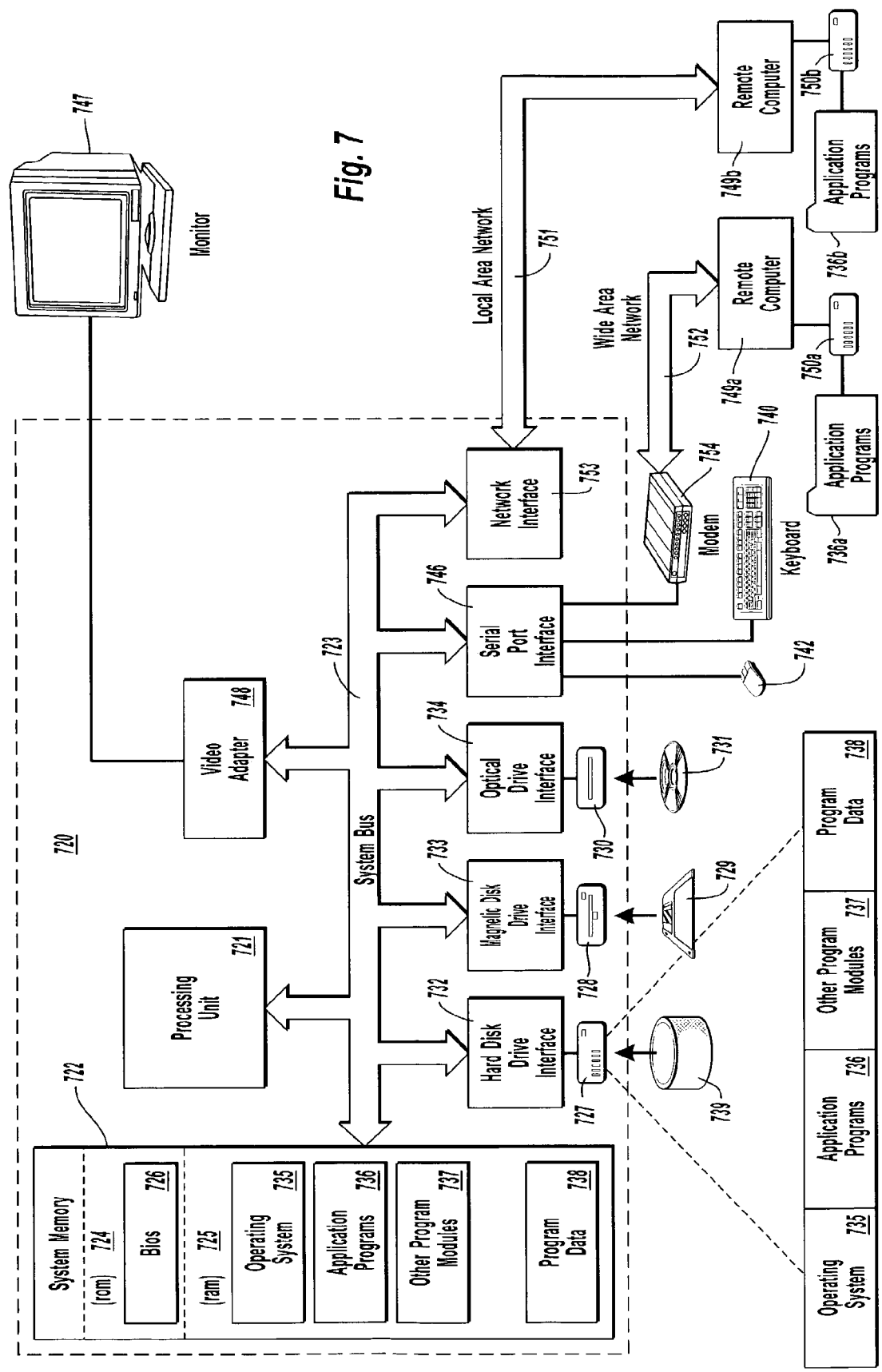
FIG. 7, illustrates an example system that provides a suitable operation environment for the present invention.

FIG. 7 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an exemplary system for implementing the invention includes a general purpose computing device in the form of a conventional computer 720, including a processing unit 721, a system memory 722, and a system bus 723 that couples various system components including the system memory 722 to the processing unit 721. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disk drive 728 for reading from or writing to a removable magnetic disk 729, and an optical disk drive 730 for reading from or writing to removable optical disk 731 such as a CD-ROM or other optical media. The magnetic hard disk drive 727, magnetic disk drive 728, and optical disk drive 730 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 739, magnetic disk 729, optical disk 731, ROM 724 or RAM 725, including an operating system 735, one or more application programs 736, other program modules 737, and program data 738. A user may enter commands and information into the computer 720 through keyboard 740, pointing device 742, or other input devices (not shown), such as a microphone, joy stick, game pad, satellite dish, scanner, or the like. These and other input devices are often connected to the processing unit 721 through a serial port interface 746 coupled to system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 749a and 749b. Remote computers 749a and 749b may each be another personal computer, a server, a router, a network PC, a peer device or other common network node, and typically include many or all of the elements described above relative to the computer 720, although only memory storage devices 750a and 750b and their associated application programs 736a and 736b have been illustrated in FIG. 7. The logical connections depicted in FIG. 7 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 is connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a computer system comprising an operating system and compiled software that calls one or more routines, a method of providing a more robust system with enhanced error diagnosis capabilities by instrumenting the compiled software to include diagnostic information so that when an error occurs an origin of a call to the one or more routines may be more easily and uniquely identified, the method comprising acts of:

unassembling the compiled software into a plurality of instructions by taking a sequence of binary bytes representing the compiled software and converting them into logical instructions suitable for execution;

searching the unassembled software for one or more instructions that identify at least one call to a routine of interest, wherein the at least one call comprises a parameter portion and a routine portion;

modifying at least one of the parameter portion or the routine portion of the at least one call with diagnostic information including a unique stop code, wherein the unique stop code is unique to the at least one call to the routine of interest, and is reserved for use by the operating system, such that if an error, a stop code, or both, caused or issued by the at least one call occurs during normal operation of the compiled software, the error, stop code, or both, can be traced back to the area within the compiled software wherein the at least one call resides; and recording the diagnostic information including the unique stop code along with the at least one call so that the at least one call may be subsequently identified from within the routine of interest.

2. The method of claim 1, wherein the act of modifying replaces the at least one call with a new call to a new routine, and wherein the new routine calls the at least one call.

3. The method of claim 1, wherein the act of unassembling the compiled software into a plurality of instructions is performed at the time of loading the compiled software by the operating system.

4. The method of claim 2, wherein the acts of modifying and recording are performed at the time of loading the compiled software by the operating system.

5. The method of claim 1, wherein the act of unassembling the compiled software is performed prior to the time of loading the compiled software by the operating system.

6. The method of claim 5, wherein the acts of modifying and recording are performed prior to the time of loading the compiled software by the operating system.

7. The method of claim 5, further comprising the act of:
retrieving information about the one or more instructions that identify the at least one call to a routine of interest, wherein the act of modifying is performed at the time of loading the compiled software by the operating system.

8. The method of claim 7, wherein the act of recording is performed prior to the time of loading the compiled software by the operating system.

9. The method of claim 7, wherein the act of recording is performed at the time of loading the compiled software by the operating system.

10. The method of claim 1, wherein the act of searching the unassembled software comprises searching the unassembled software for a pattern in the plurality of instructions.

11. The method of claim 1, wherein the compiled software comprises an application.

12. The method of claim 1, wherein the compiled software comprises a device driver.

13. The method of claim 1, further comprising an act of storing the diagnostic information and the at least one call for subsequent retrieval.

14. The method of claim 1, wherein the at least one call is identified by having satisfied a predefined threshold of matching criteria.

15. The method of claim 14, wherein the matching criteria comprises at least one of a pattern for the at least one call, a predefined modeling of the at least one call, or a portion of a load table for the one or more routines.

16. In a computer system comprising an operating system and compiled software that calls one or more routines, a method of providing a more robust system with enhanced error diagnosis capabilities by instrumenting the compiled software to include diagnostic information so that when an error occurs an origin of a call to the one or more routines may be more easily and uniquely identified, the method comprising steps for:
producing a plurality of software instructions from the compiled software by taking a sequence of binary bytes representing the compiled software and converting them into logical instructions suitable for execution;
identifying, from the plurality of instructions produced from the compiled software, at least one original call to a routine of interest;
distinguishing the at least one original call to the routine of interest from any other call to the routine of interest by replacing at least a portion of the at least one original call with diagnostic information including a unique stop code wherein the unique stop code is unique to the distinguished call to the routine of interest, and is reserved for use by the operating system, such that if an error, stop code, or both, caused or issued by the distinguished call occurs during normal operation of the compiled software, the error, stop code, or both, can be traced back to the area within the compiled software wherein the distinguished call resides; and
mapping the at least one distinguished call that includes the unique stop code to the at least one original call so that a location of the at least one original call may be subsequently identified from within the routine of interest based on the original call having been distinguished from any other call to the routine of interest.

17. The method recited in claim 16, wherein the at least one original call comprises a parameter portion and a routine portion.

18. The method recited in claim 17, wherein the step for distinguishing the at least one original call comprises an act of modifying the parameter portion of the at least one original call, the routine portion of the at least one original call, or both, with diagnostic information that uniquely identifies the at least one call to the routine of interest.

19. The method of claim 18, wherein the act of modifying replaces the original call with a new call to a new routine, and wherein the new routine calls the original call.

20. The method recited in claim 18, wherein the steps for producing, identifying and distinguishing are performed at run-time when loading the compiled software onto an operating system.

21. The method recited in claim 16, wherein the steps for producing, identifying and distinguishing are performed offline without loading the compiled software onto an operating system.

22. The method recited in claim 16, wherein the steps for producing, identifying and distinguishing are performed at run-time after loading the compiled software onto an operating system.

23. The method recited in claim 16, wherein the steps for producing and identifying are performed offline without loading the compiled software onto an operating system, and wherein the step for distinguishing is performed at run-time after loading the compiled software onto the operating system.

24. The method recited in claim 16, wherein the step for identifying at least one original call to a routine of interest comprises searching the plurality of instructions for a pattern.

25. The method recited in claim 16, wherein the compiled software comprises an application.

26. The method recited in claim 16, wherein the compiled software comprises a device driver.

27. The method recited in claim 16, further comprising an act of storing the mapping information for subsequent retrieval, wherein the mapping is performed such that unique diagnostic data associated with the routine of interest is traceable back to the at least one original call to a routine of interest.

28. The method recited in claim 16, wherein the at least one original call is identified by having satisfied a predefined threshold of matching criteria.

29. The method recited in claim 28, wherein the matching criteria comprises at least one of a pattern for the at least one call, a predefined modeling of the at least one call, or a portion of a load table for the one or more routines.

30. In a computer system comprising an operating system and compiled software that calls one or more routines, a computer program product comprising one or more computer readable storage media having stored thereon computer executable instructions that implement a method of providing a more robust system with enhanced error diagnosis capabilities by instrumenting the compiled software to include diagnostic information so that when an error occurs an origin of a call to the one or more routines may be more easily and uniquely identified, the method comprising acts of:

unassembling the compiled software into a plurality of instructions by taking a sequence of binary bytes representing the compiled software and converting them into logical instructions suitable for execution;

searching the unassembled software for one or more instructions that identify at least one call to a routine of interest, wherein the at least one call comprises a parameter portion and a routine portion;

modifying at least one of the parameter portion or the routine portion of the at least one call with diagnostic information including a unique stop code, wherein the unique stop code is unique to the at least one call to the routine of interest, and is reserved for use by the operating system such that if an error, a stop code, or both, caused or issued by the at least one call occurs during normal operation of the compiled software, the error, stop code, or both, can be traced back to the area within the compiled software wherein the at least one call resides; and recording the diagnostic information including the unique stop code along with the at least one call so that the at least one call may be subsequently identified from within the routine of interest.

31. The computer readable storage media of claim 30, wherein the act of modifying replaces the at least one call with a new call to a new routine, and wherein the new routine calls the at least one call.

32. The computer readable storage media of claim 30, wherein the acts of unassembling, modifying and recording are performed at the time of loading the compiled software by the operating system.

33. The computer readable storage media of claim 30, wherein the acts of unassembling, modifying and recording are performed prior to the time of loading the compiled software by the operating system.

34. The computer readable storage media of claim 30, further comprising the act of:

retrieving information about the one or more instructions that identify the at least one call to a routine of interest, wherein the act of unassembling is performed prior to loading the compiled software by the operating system, and wherein the acts of modifying and recording are performed at the time of loading the compiled software by the operating system.

35. The computer readable storage media of claim 30, wherein the act of searching the unassembled software comprises searching the unassembled software for a pattern in the plurality of instructions.

36. The computer readable storage media of claim 30, wherein the compiled software comprises an application.

37. The computer readable storage median of claim 30, wherein the compiled software comprises a device driver.

38. The computer readable storage media of claim 30, further comprising an act of storing the diagnostic information and the at least one call for subsequent retrieval.

39. The computer readable storage media of claim 30, wherein the at least one call is identified by having satisfied a predefined threshold of matching criteria.

40. The computer readable storage media of claim 39, wherein the matching criteria comprises at least one of a pattern for the at least one call, a predefined modeling of the at least one call, or a portion of a load table for the one or more routines.

41. In a computer system comprising an operating system and compiled software that calls one or more routines, a computer readable storage media carrying having stored thereon computer executable instructions that implement a method of providing a more robust system with enhanced error diagnosis capabilities by instrumenting the compiled software to include diagnostic information so that when an error occurs an origin of a call to the one or more routines may be more easily and uniquely identified, the method comprising steps for:

producing a plurality of software instructions from the compiled software by taking a sequence of binary bytes representing the compiled software and converting them into logical instructions suitable for execution;

identifying, from the plurality of instructions produced from the compiled software, at least one original call to a routine of interest;

distinguishing the at least one original call to the routine of interest from any other call to the routine of interest by replacing at least a portion of the at least one original call with diagnostic information including a unique stop code wherein the unique stop code is unique to the distinguished call to the routine of interest, and reserved for use by the operating system, such that if an error, stop code, or both, caused or issued by the distinguished call occurs during normal operation of the compiled software, the error, stop code, or both, can be traced back to the area within the compiled software wherein the distinguished call resides; and mapping the at least one distinguished call that includes the unique stop code to the at least one original call so that a location of the at least one original call may be subsequently identified from within the routine of interest based on the original call having been distinguished from any other call to the routine of interest, the mapping further including information about one or more of the compiled software that comprises the routine of interest, an original stop code, or an offset in the binary code where the unique stop code is located.

42. The computer readable storage media recited in claim 41, wherein the at least one original call comprises a parameter portion and a routine portion.

43. The computer readable storage media recited in claim 41, wherein the step for distinguishing the at least one original call comprises an act of modifying the parameter portion of the at least one original call, the routine portion of the at least one original call, or both, with diagnostic information that uniquely identifies the at least one call to the routine of interest.

44. The computer readable storage media of claim 43, wherein the act of modifying replaces the original call with a new call to a new routine, and wherein the new routine calls the original call.

45. The computer readable storage media recited in claim 44, wherein the steps for producing, identifying and distinguishing are performed at run-time after loading the compiled software onto an operating system.

46. The computer readable storage media recited in claim 41, wherein the steps for producing, identifying and distinguishing are performed offline without loading the compiled software onto an operating system.

47. The computer readable storage media recited in claim 41, wherein the steps for producing, identifying and distinguishing are performed at run-time after loading the compiled software onto an operating system.

48. The computer readable storage media recited in claim 41, wherein the steps for producing and identifying are performed offline without loading the compiled software onto an operating system, and wherein the step for distinguishing is performed at run-time after loading the compiled software onto an operating system.

49. The computer readable storage media recited in claim 41, wherein the at least one original call is identified by having satisfied a predefined threshold of matching criteria.

50. The computer readable storage media recited in claim 49, wherein the matching criteria comprises at least one of a pattern for the at least one call, a predefined modeling of the at least one call, or a portion of a load table for the one or more routines.

* * * * *